United States Patent
Marques et al.

[11] Patent Number: 6,113,129
[45] Date of Patent: Sep. 5, 2000

[54] WHEELED BEACH CART CONSTRUCTION

[76] Inventors: Monica Dubowski Marques; Marcelo Marques, both of 7961 Algon Ave., 2nd Floor, Philadelphia, Pa. 19111

[21] Appl. No.: 09/264,016

[22] Filed: Mar. 8, 1999

[51] Int. Cl.$^7$ .................................................. B62B 1/04
[52] U.S. Cl. ...................... 280/654; 248/129; 280/47.19; 280/47.28; 280/47.29
[58] Field of Search .................................. 280/30, 35, 40, 280/645, 652, 654, 47.19, 47.18, 47.26, 47.28, 47.29; 248/127, 129

[56] References Cited

U.S. PATENT DOCUMENTS

| | | | |
|---|---|---|---|
| 3,677,571 | 7/1972 | Maturo, Jr. et al. | 280/36 |
| 4,815,761 | 3/1989 | Henderson et al. | 280/47 |
| 4,865,346 | 9/1989 | Carlile | 280/47.29 X |
| 5,169,164 | 12/1992 | Bradford | 280/35 |
| 5,213,360 | 5/1993 | Lin | 280/30 X |
| 5,460,307 | 10/1995 | Stevenson | 280/30 X |
| 5,464,237 | 11/1995 | Saporiti | 280/47.26 X |
| 5,630,602 | 5/1997 | Vanderslice et al. | 280/47.26 |
| 5,636,852 | 6/1997 | Sistrunk et al. | 280/47.29 X |
| 5,660,403 | 8/1997 | O'Neill et al. | 280/47.19 |
| 5,845,915 | 12/1998 | Wilson | 280/47.29 X |

*Primary Examiner*—Michael Mar
*Attorney, Agent, or Firm*—Henderson & Sturm LLP

[57] ABSTRACT

A wheeled beach cart construction 10 including a wheeled framework member 20 a support leg member 30 pivotally associated with the lower end of the framework member 20 and dimensioned to support a beverage cooler and a beach chair support unit 13 rotatably associated with the upper portion of the framework member 20, wherein the beach chair support unit 13 includes a pair of extendable and retractable support arm members 40 slidably disposed on a cross-piece element 41 rotatably suspended in the framework member 20.

12 Claims, 1 Drawing Sheet

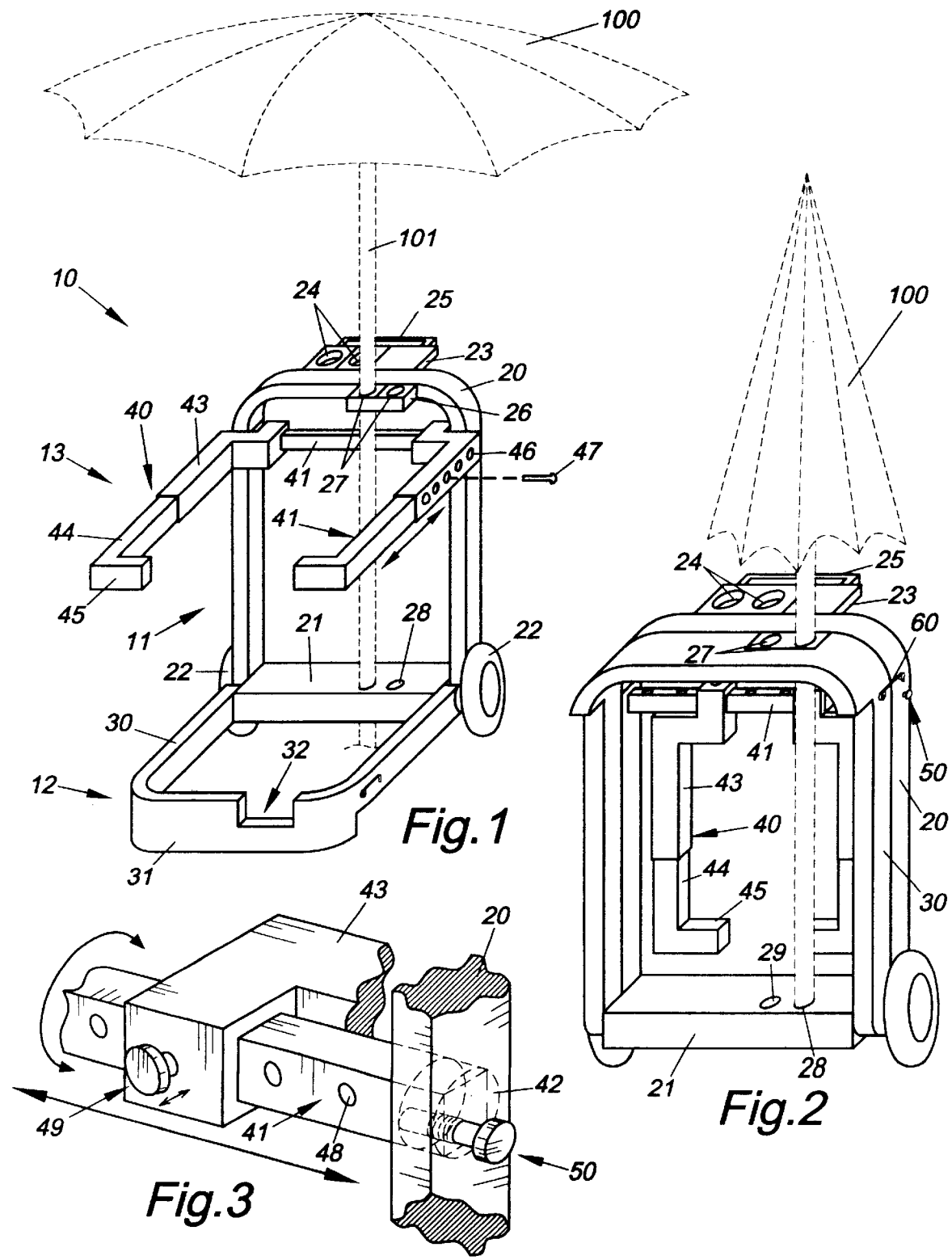

WHEELED BEACH CART CONSTRUCTION

BACKGROUND OF THE INVENTION

1. Field of the Invention

The present invention relates to the field of wheeled cart constructions in general and in particular to a wheeled beach cart construction having unique storage extension and retraction features.

2. Description of Related Art

As can be seen by reference to the following U.S. Pat. Nos. 3,677,571; 4,815,761; 5,169,164; 5,660,403 and 5,630,602, the prior art is replete with myriad and diverse wheeled beach cart construction.

While all of the aforementioned prior art constructions are more than adequate for the basic purpose and function for which they have been specifically designed, they are uniformly deficient with respect to their failure to provide a simple, efficient, and practical wheeled cart construction designed to transport a cooler and a plurality of beach chairs plus miscellaneous articles to and from the beach.

As any beach goer is all too well aware, the main problem encountered in this activity is the difficulty in transporting all of the sundry articles that are required to enjoy a day at the beach in the fewest trips possible; and given the size and bulk of most beach accessories, this objective is rarely accomplished in only one trip.

As a consequence of the foregoing situation, there has existed a longstanding need for a new and improved wheeled beach cart construction which is designed to accommodate virtually all of the commonly used articles that are required during a day at the beach in a single trip; and, the provision of such a construction is the stated objective of the present invention.

BRIEF SUMMARY OF THE INVENTION

Briefly stated, the wheeled beach cart construction that forms the! basis of the present invention comprises in general a wheeled framework unit, a cooler support unit pivotally secured to the framework unit and a beach chair support unit which is rotatably suspended from the wheeled framework unit.

As will be explained in greater detail further on in the specification, the wheeled framework unit comprises an open framework member having a cross-piece member extending across its lower end, wherein the cooler support unit comprises a generally U-shaped support leg member pivotally secured to the framework member; wherein, the framework member and the support member have a plurality of apertures and at least one recess both for the transport of a beach umbrella to a point of use and to laterally support the shaft of a beach umbrella when the shaft is embedded in the sand.

In addition, the beach chair support unit comprises a cross-piece element rotatably suspended in the upper portion of the framework member and a pair of telescoping support arms which are laterally moveable with respect to the cross-piece member; wherein, the cross-piece element is further provided with a locking mechanism to captively engage the cross-piece element in a selective angular orientation relative to the framework member to either extend or collapse the support arm members relative to the framework member.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the beach cart construction in the fully extended mode;

FIG. 2 is a perspective view of the beach cart construction in the fully collapsed mode; and, FIG. 3 is an isolated detail view of the operative connection between the wheeled framework unit and the beach chair support unit.

DETAILED DESCRIPTION OF THE INVENTION

As can be seen by reference to the drawings, and in particular to FIG. 1, the wheeled beach cart construction that forms the basis of the present invention is designated generally by the reference number 10. The construction 10 comprises in general a wheeled framework unit 11 a hinged cooler support unit 12 and beach chair support unit 13. These units will now be described in seriatim fashion.

As shown in FIG. 1, the wheeled framework unit 11 comprises ci generally inverted U-shaped framework member 20 having an enlarged generally rectangular lower cross-piece member 21 extending across its lower end; wherein, an elongated axle element (not shown) extends through the lower cross-piece member 21 and has opposite ends which rotatably support a pair of wheel elements 22 in a well-recognized fashion.

Turning now to FIGS. 1 and 2, it can be seen that the upper end of the framework member 20 is provided with a rearwardly projecting tray element 23 having a plurality of drink holder apertures 24 formed therein; wherein, the outboard end of the tray element 23 further defines a handle 25.

In addition, the upper end of the framework member 20 is also provided with a forward-projecting shelf element 26 having a pair of apertures 27 dimensioned to receive the shaft 101 of a beach umbrella 100 wherein the pair of apertures 27 are aligned with a recess 28 and an aperture 29 whose purpose and function will be described presently.

As shown in FIG. 2, when a person wishes to transport an umbrella to the beach, the shaft 101 of the umbrella 100 is inserted into the aperture 27 that is aligned with the recess 28 so that the point of the umbrella shaft 101 will be supported in the recess 28. Then, once the cart construction 10 reaches the desired location, the umbrella shaft can be transferred to the other apertures 27 and 29 to drive the umbrella shaft 101 into the sand; wherein the framework member 20 and the crosspiece member 21 will provide lateral stability to the umbrella shaft 101.

Still referring to FIGS. 1 and 2, it can be seen that the cooler support unit 12 comprises a generally U-shaped support leg member 30 dimensioned to support a beverage cooler (not shown) wherein the in-board end of the support arm member 30 is pivotally connected to the opposite sides of the cross-piece member 21 and the outboard end of the support leg member 30 has a downwardly projecting foot portion 31, and an enlarged recess 32 dimensioned to receive the umbrella shaft support shelf 26 when the support leg member 30 is pivoted into the collapsed mode as depicted in FIG. 2.

Turning now to FIGS. 1 through 3, it can be seen that the beach chair support unit 13 comprises a pair of support arm members 40 which are slidably received on an elongated rectangular cross-piece element 41 which is rotatably suspended in circular recesses 42 formed on opposite sides of the upper portion of the framework member 20.

As shown in FIGS. 1 and 3, each of the support arm members 40 have a captive inner segment 43 slidably received on the cross-piece element 41 and a free outer segment 44 slidably received within the inner segment 43 and provided with an inwardly directed hook portion 45 disposed on its outboard end.

In addition, both the inner 43 and outer 44 arm segments are further provided with apertures 46 which are dimensioned to receive locking pins 47 whereby the effective length of the support arms 40 may be adjusted in a well-recognized fashion.

As can best be appreciated by reference to FIG. 3, the cross-piece element 41 is provided with a plurality of apertures 48 which are dimensioned to receive a retractable locking pin 49 which is carried by the inboard end of the inner support arm segment 41 so that the lateral spacing of the support arm members 40 relative to the cross-piece element 41 can be varied.

In addition, the opposite ends of the cross-piece element 41 are provided with a locking mechanism designated generally as 50 that allows the cross-piece element 41 to be captively engaged at a desired angular rotation within the circular recesses 42 in the support framework member 20 such that the cross-piece element 41 and the attached support arms 40 can be pivoted from the extended position depicted in FIG. 1 to the retracted position depicted in FIG. 2.

Furthermore, as shown in FIG. 2, the support leg member 30 can be provided with one or more latch elements for releasably securing the support leg member 30 to the framework member 20 when the device 10 is in the collapsed mode.

Although only an exemplary embodiment of the invention has been described to detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

We claim:

1. A wheeled beach cart construction comprising
   a wheeled framework unit including a generally inverted U-shaped framework member having an enlarged cross-piece member extending across the lower end of the framework member and a pair of wheels disposed on the opposite sides of the lower end of the framework member
   a cooler support unit including a generally U-shaped support leg member having an inboard end pivotally connected to the lower portion of the framework unit; and,
   a beach chair support unit including a cross-piece element rotatably associated with the upper portion of said framework member, said cross-piece element having a locking mechanism for captively engaging the cross-piece element at a particular angular orientation relative to said framework member and a pair of support arm members slidably disposed on said cross-piece element, each support arm member being non-rotatably mounted to said cross-piece element for simultaneous rotation therewith and each support arm member having means for captively engaging the support arm member at a desired location along the cross-piece element, wherein the support arm members are adapted to be secured in first laterally spaced positions along the cross-piece element after being pivoted to an extended use position, and the support arm members are adapted to be secured in second laterally spaced positions along the cross-piece, the second laterally spaced positions being laterally inwardly of the first laterally spaced positions, for permitting the support arm members to be pivoted to a non-use position within the framework member.

2. The construction as in claim 1, wherein each of said support arm members are extendable and retractable relative to said cross-piece element.

3. The construction as in claim 1, wherein the upper end of the framework member is provided with a rearwardly extending tray element having at least one drink holding aperture.

4. The construction as in claim 3, wherein said tray element is further provided with a handle.

5. The construction as in claim 1, wherein the outboard end of the support leg member is provided with a downwardly depending foot portion.

6. The construction as in claim 1, wherein the upper end of the framework member is provided with a pair of apertures wherein each aperture is dimensioned to receive the shaft of a beach umbrella.

7. The construction as in claim 6, wherein the cross-piece member is provided with a recess aligned with one of said pair of apertures in the upper end of the framework member wherein said recess is dimensioned to receive the bottom of the shaft of a beach umbrella.

8. The construction as in claim 7, wherein the cross-piece member is further provided with an aperture aligned with the other of said pair of apertures in the upper end of the framework member wherein said apertures are dimensioned to receive the shaft of a beach umbrella.

9. The construction as in claim 6, wherein said pair of apertures are formed in a shelf element which projects forward from the upper end of the framework member.

10. The construction as in claim 9, wherein the support leg member has an outboard end provided with an enlarged recess dimensioned to receive said shelf element when the support leg member is pivoted into engagement with the framework member.

11. The construction as in claim 1, wherein each of the support arm members are provided with means for adjusting the effective length of the support arm member relative to the cross-piece element.

12. The construction as in claim 1, wherein the support leg member is provided with a latch element adapted to engage a portion of the framework member.

* * * * *